(12) United States Patent
Yu et al.

(10) Patent No.: US 8,793,425 B2
(45) Date of Patent: Jul. 29, 2014

(54) USB DEVICE AND DETECTION METHOD THEREOF

(75) Inventors: Jing Yu, Shanghai (CN); Shaobin Huang, Shanghai (CN); Kui Du, Shanghai (CN)

(73) Assignee: Shanghai Actions Semiconductor Co., Ltd. (CN)

( * ) Notice: Subject to any disclaimer, the term of this patent is extended or adjusted under 35 U.S.C. 154(b) by 0 days.

(21) Appl. No.: 13/989,101

(22) PCT Filed: Nov. 24, 2011

(86) PCT No.: PCT/CN2011/082826
§ 371 (c)(1),
(2), (4) Date: May 23, 2013

(87) PCT Pub. No.: WO2012/068997
PCT Pub. Date: May 31, 2012

(65) Prior Publication Data
US 2013/0326094 A1 Dec. 5, 2013

(30) Foreign Application Priority Data

Nov. 24, 2010 (CN) .......................... 2010 1 0557614

(51) Int. Cl.
*G06F 13/14* (2006.01)
*G06F 13/38* (2006.01)
*G06F 11/267* (2006.01)
*G06F 13/00* (2006.01)

(52) U.S. Cl.
CPC ............ *G06F 13/385* (2013.01); *G06F 11/267* (2013.01)
USPC ................................ 710/313; 710/110; 710/8

(58) Field of Classification Search
CPC ................................ G06F 13/14; G06F 13/40
USPC ........................................ 710/305–313, 110, 8
See application file for complete search history.

(56) References Cited

U.S. PATENT DOCUMENTS 6,442,734 B1 * 8/2002 Hanson et al. ................. 716/136
6,460,094 B1 * 10/2002 Hanson et al. ..................... 710/8
(Continued)

FOREIGN PATENT DOCUMENTS

CN 1310402 A 8/2001
CN 101221546 A 7/2008
(Continued)

*Primary Examiner* — Christopher Shin
(74) *Attorney, Agent, or Firm* — DLA Piper LLP (US)

(57) ABSTRACT

A USB device and a detection method therefor. It can be detected whether the USB device is a master device or a slave device without the use of an ID pin, thereby saving the pin resources of the USB device. The USB device comprises: a series branch formed by a first pull-up resistor (R1) and a first switch (S1) and having one end connected to VCC and the other end connected to a D+ or D− data line; a series branch formed by a second pull-up resistor (R2) and a second switch (S2) and having one end connected to the VCC and the other end connected to the D+ data line; a series branch formed by a third pull-up resistor (R3) and a third switch (S3) and having one end connected to VCC and the other end connected to the D− data line; a series branch formed by a fourth pull-up resistor (R4) and a fourth switch (S4) and having one end being grounded and the other end connected to the D+ data line; and a series branch formed by a fifth pull-up resistor (R5) and a fifth switch (S5) and having one end being grounded and the other end connected to the D− data line. The USB device belongs to the field of communication devices.

15 Claims, 8 Drawing Sheets

(56) References Cited

U.S. PATENT DOCUMENTS

| | | | |
|---|---|---|---|
| 6,526,468 B1* | 2/2003 | Larochelle et al. | 710/305 |
| 6,625,790 B1* | 9/2003 | Casebolt et al. | 710/8 |
| 6,671,765 B1* | 12/2003 | Karlsson et al. | 710/310 |
| 6,795,949 B2* | 9/2004 | Hanson et al. | 716/106 |
| 6,907,492 B2* | 6/2005 | Matsuda et al. | 710/313 |
| 7,277,966 B2* | 10/2007 | Hanson et al. | 710/16 |
| 7,350,094 B2* | 3/2008 | Tsai et al. | 713/500 |
| 7,404,022 B2* | 7/2008 | Qin et al. | 710/110 |
| 7,478,191 B2* | 1/2009 | Wurzburg et al. | 710/316 |
| 7,607,585 B2* | 10/2009 | Cho | 235/492 |
| 7,644,217 B2* | 1/2010 | Butler et al. | 710/302 |
| 7,779,171 B2* | 8/2010 | Hanson et al. | 710/16 |
| 7,836,239 B2* | 11/2010 | Duval et al. | 710/305 |
| 7,975,078 B2* | 7/2011 | Hanson et al. | 710/16 |
| 8,157,180 B2* | 4/2012 | Cho | 235/492 |
| 2003/0206547 A1* | 11/2003 | Cho | 370/364 |
| 2004/0133820 A1* | 7/2004 | Tanabe et al. | 713/600 |
| 2006/0069841 A1* | 3/2006 | Qin et al. | 710/313 |
| 2007/0106825 A1* | 5/2007 | Duval et al. | 710/106 |
| 2010/0005207 A1* | 1/2010 | Cho | 710/107 |
| 2011/0029703 A1* | 2/2011 | Huo et al. | 710/110 |

FOREIGN PATENT DOCUMENTS

| | | |
|---|---|---|
| CN | 101359316 A | 2/2009 |
| JP | 2005-196352 A | 7/2005 |

* cited by examiner

USB DEVICE AND DETECTION METHOD THEREOF

The present application is a US National Stage of International Application No. PCT/CN2011/082826, filed 24 Nov. 2011, designating the United States, and claiming priority to Chinese Patent Application No. 201010557614.1, filed with the State Intellectual Property Office of China on Nov. 24, 2010 and entitled "USB device and detection method thereof", which is hereby incorporated by reference in its entirety.

FIELD OF THE INVENTION

The present invention relates to the field of communication devices and particularly to a USB device and a method for detecting the USB device.

BACKGROUND OF THE INVENTION

A Universal Serial Bus (USB) device in compliance with the USB 2.0 specification is typically a Dual Role Device (DRD) device, which can be acted as a master device, also can be acted as a slave device. As illustrated in FIG. 1a, which is a schematic structural diagram of a USB device in compliant with the USB 2.0 specification, connection pins of the USB device include a VBUS pin, an ID pin, a GND pin and D+ and D− pins, and the USB device internally includes a data transceiver circuit having outputs connected to the D+ pin and D− pin through D+ data line and D− data line and a VBUS drive control module connected to the VBUS pin through a VBUS data line, where the D+ data line is grounded through a pull-down resistor R4 and a switch S4, and the D− data line is grounded through a pull-down resistor R5 and a switch S5, and if the USB device is a high-speed or full-speed device, then the D+ data line is connected to a power supply VCC through a pull-up resistor R1 and a switch S1, and if the USB device is a low-speed device, then the D− data line is connected to VCC through the pull-up resistor R1 and the switch S1 as illustrated in FIG. 1b.

The existing USB DRD identifies whether the present USB device is a master device or a slave device at a specific time point by taking a level of the ID pin among the connection pins of the USB device as a criterion so that the USB device is a USB slave device if the level of the ID pin is a high level and a master device if level of the ID pin is a low level. However, this detection method has such a drawback that a resource of one pin in a chip of the USB device has to be occupied, because the ID pin is required in the USB device.

SUMMARY OF THE INVENTION

The invention provides a USB device and a method for detecting the USB device so that whether the USB device is a master device or a slave device can be detected without an ID pin to thereby save a pin resource of the USB device.

A USB device includes: a data transceiver circuit having outputs connected respectively with D+ and D− data lines; and a VBUS drive control module, wherein the USB device further includes:

a first pull-up resistor, a second pull-up resistor, a third pull-up resistor, a first switch, a second switch, and a third switch, wherein a series branch, composed of the first pull-up resistor and the first switch, having one end connected with a VCC and the other end connected with the D+ data line or the D− data line, a series branch, composed of the second pull-up resistor and the second switch, having one end connected with the VCC and the other end connected with the D+ data line, and a series branch, composed of the third pull-up resistor and the third switch, having one end connected with the VCC and the other end connected with the D− data line; and a fourth pull-down resistor, a fifth pull-down resistor, a fourth switch and a fifth switch, wherein a series branch, composed of the fourth pull-down resistor and the fourth switch, having one end grounded and the other end connected with the D+ data line, and a series branch, composed of the fifth pull-down resistor and the fifth switch, having one end grounded and the other end connected with the D− data line.

A method for detecting the USB device includes:

controlling the first pull-up resistor on the D+ data line or the D− data line of the USB device to be switched off, the fourth pull-down resistor on the D+ data line to be switched off and the fifth pull-down resistor on the D− data line to be switched off, and enabling the second pull-up resistor on the D+ data line and the third pull-up resistor on the D− data line, wherein when the first pull-up resistor and the fourth pull-down resistor on the D+ data line are switched on concurrently, or when the first pull-up resistor and the fifth pull-down resistor on the D− data line are switched on concurrently, a voltage on the first pull-up resistor is in a range of logically low levels, and when the second pull-up resistor and the fourth pull-down resistor on the D+ data line are switched on concurrently, or when the third pull-up resistor and the fifth pull-down resistor on the D− data line are switched on concurrently, a voltage on the fourth pull-down resistor or the fifth pull-down resistor is in a range of logically low levels;

controlling an output voltage of the VBUS drive control module to be 0; and detecting level statuses of the D+ data line and the D− data line of the USB device, and determining the USB device as a slave device upon determining D+=0 and D−=0.

A method for detecting the USB device includes:

controlling the first pull-up resistor on the D+ data line or the D− data line of the present USB device to be switched off, and enabling the second pull-up resistor and the fourth pull-down resistor on the D+ data line and the third pull-up resistor and the fifth pull-down resistor on the D− data line of the USB device, wherein when the first pull-up resistor and the fourth pull-down resistor on the D+ data line are switched on concurrently, or when the first pull-up resistor and the fifth pull-down resistor on the D− data line are switched on concurrently, a voltage on the first pull-up resistor is in a range of logically low levels, and when the second pull-up resistor and the fourth pull-down resistor on the D+ data line are switched on concurrently, or when the third pull-up resistor and the fifth pull-down resistor on the D− data line are switched on concurrently, a voltage on the fourth pull-down resistor or the fifth pull-down resistor is in a range of logically low levels;

controlling an output voltage of the VBUS drive control module to be valid; and detecting level statuses of the D+ data line and the D− data line of the present USB device, and determining the present USB device as a master device upon determining D+=0 and D−=1, or D+=1 and D−=0.

With the USB device according to the embodiment of the invention, the pull-up resistor R2 and the switch S2 are added on the D+ data line, the pull-up resistor R3 and the switch S3 are added on the D− data line, the statuses of the pull-up resistors R1, R2 and R3 and the pull-down resistors R4 and R5 are controlled, and the output voltage of the VBUS drive control module is controlled to be valid or not, so that whether the USB device is a master device or a slave device can be detected without an ID pin to thereby save a pin resource of the USB device.

DETAILED DESCRIPTION OF THE EMBODIMENTS

An USB device according to embodiments of the invention further includes a pull-up resistor R2 and a switch S2 on the D+ data line and a pull-up resistor R3 and a switch S3 on the D− data line in addition to the existing USB device.

Figure 1A:
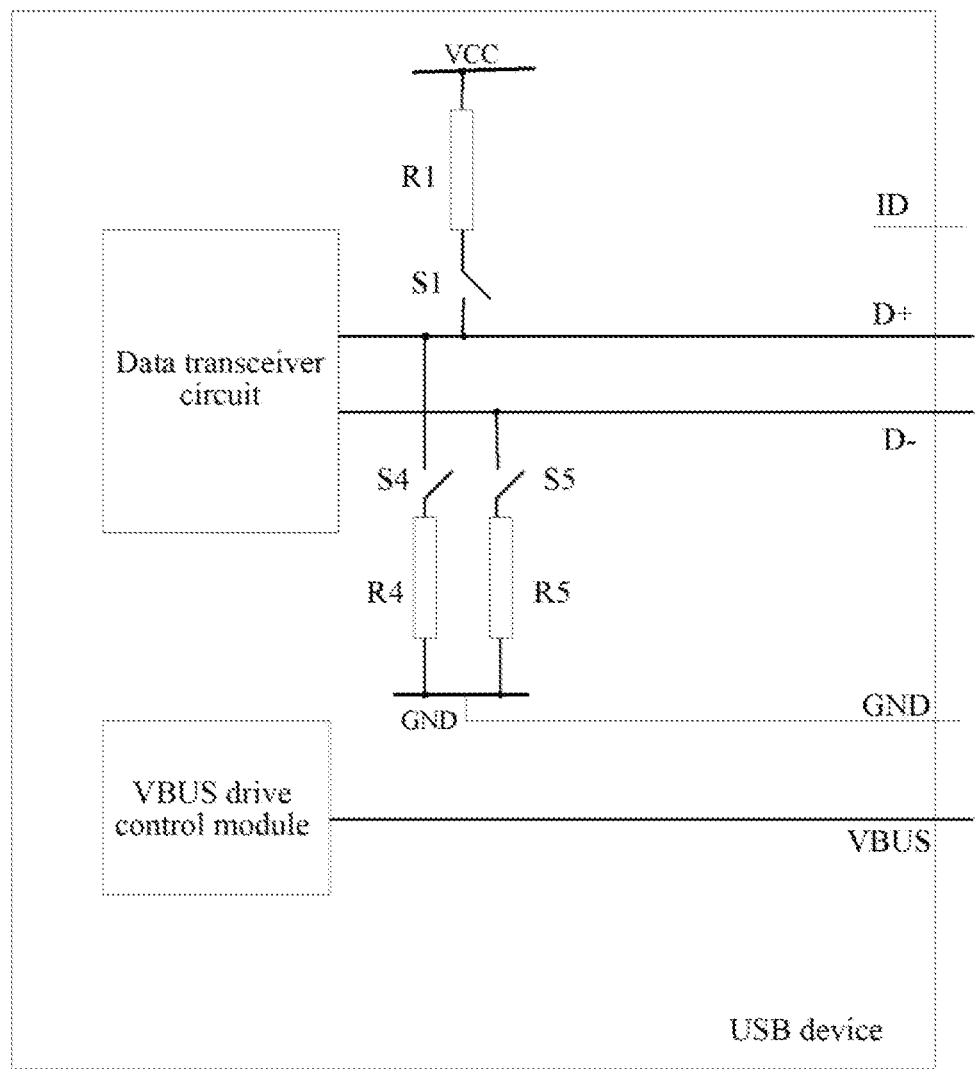
FIG. 1a is a schematic structural diagram of a high-speed USB device in the prior art.
Figure 1B:
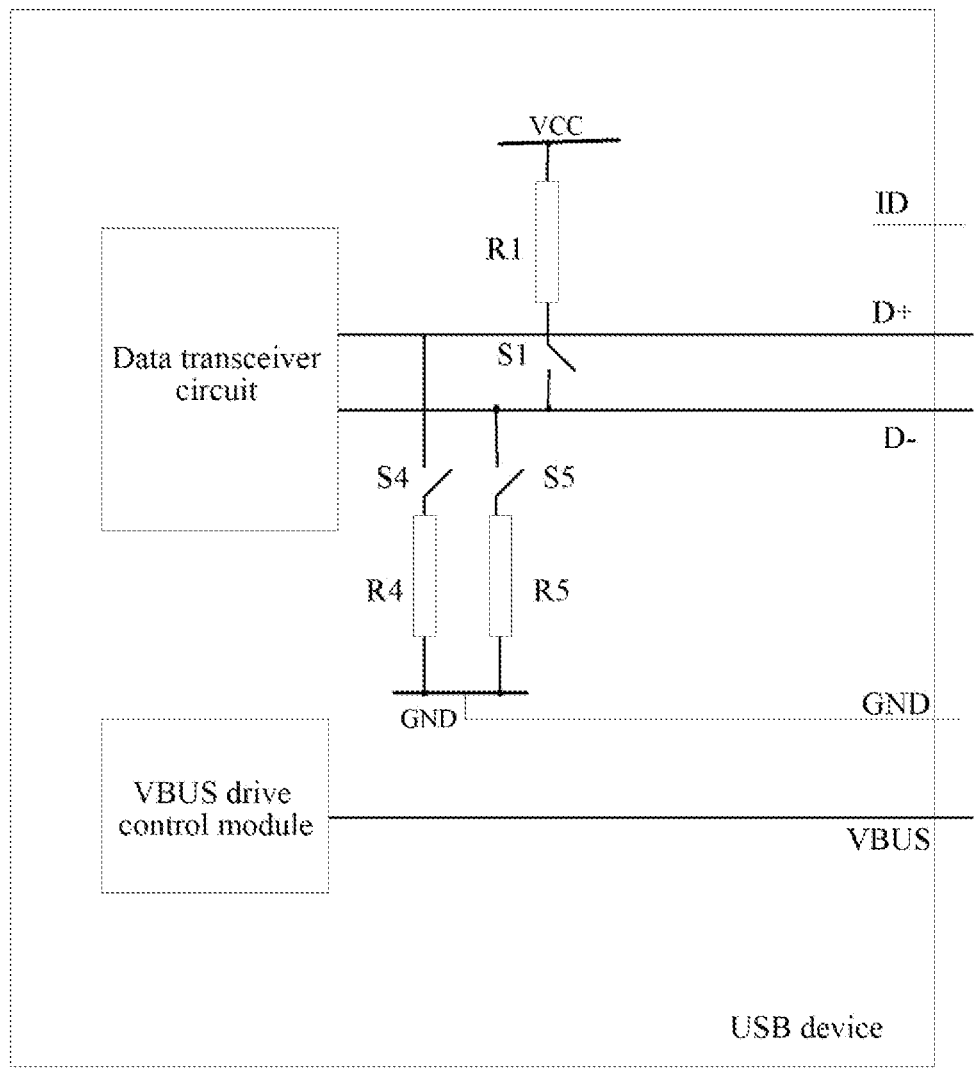
FIG. 1b is a schematic structural diagram of a low-speed USB device in the prior art.
Figure 2A:
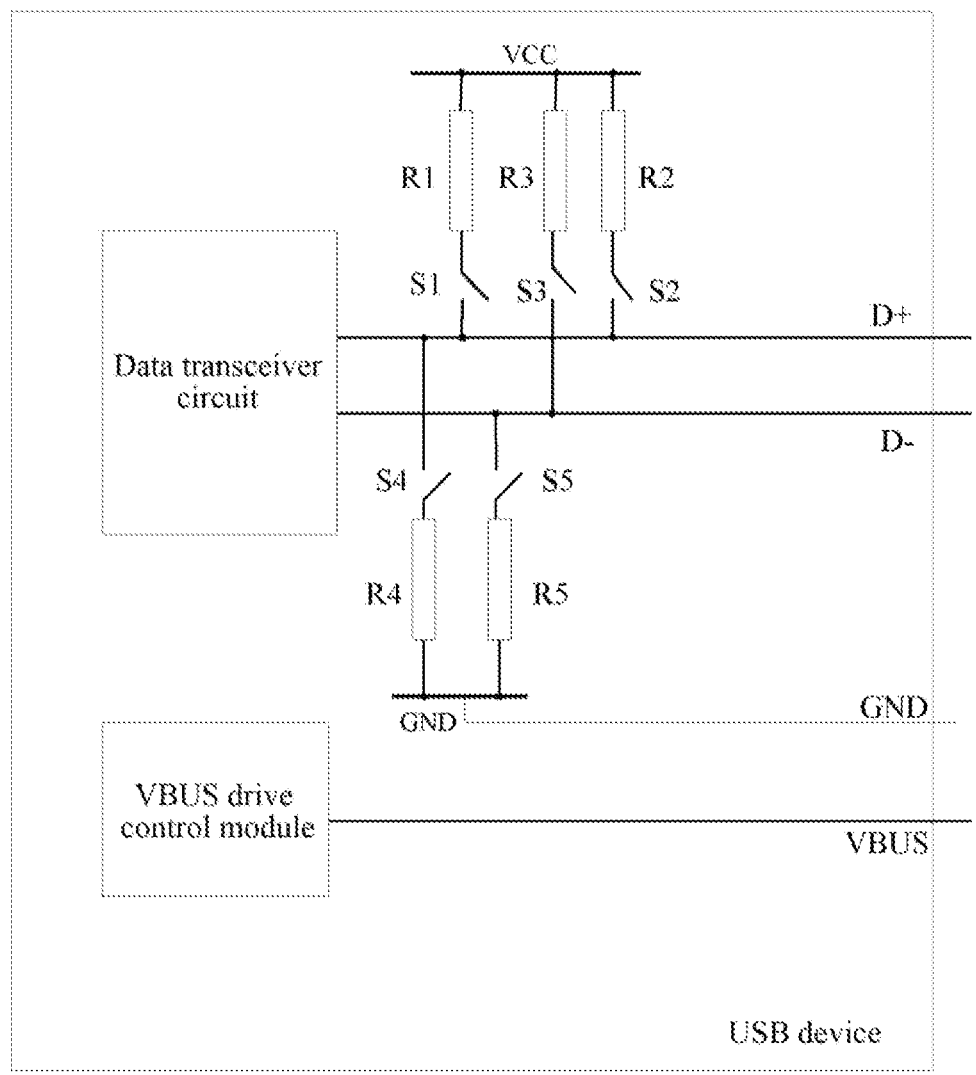
FIG. 2a is a structural diagram of a first USB device according to an embodiment of the invention.

FIG. 2a illustrates a first USB device according to an embodiment of the invention, which is a high-speed or full-speed USB device, where pins of the USB device include a VBUS pin, D+ and D− pins, and a GND pin, and the USB device includes:

a data transceiver circuit having outputs connected to the D+ and D− pins of the USB device through D+ and D− data lines;

a VBUS drive control module having an output connected to the VBUS pin of the USB device through a VBUS data line;

a series branch, composed of a pull-up resistor R1 and a controllable switch S1, having one end connected to a power supply VCC (e.g., 3.3V) and the other end connected to the D+ data line;

a series branch, composed of a pull-up resistor R2 and a controllable switch S2, having one end connected to the power supply VCC and the other end connected to the D+ data line, and a series branch, composed of a pull-up resistor R3 and a controllable switch S3, having one end connected to the power supply VCC and the other end connected to the D− data line; and a series branch, composed of a pull-down resistor R4 and a controllable switch S4, having one end grounded and the other end connected to the D+ data line, and a series branch, composed of a pull-down resistor R5 and a controllable switch S5, having one end grounded and the other end connected to the D− data line.

The resistance of the pull-up resistor R1 is the minimum, and the resistances of the pull-down resistors R4 and R5 are on the same order of magnitude and far above the resistance of the pull-up resistor R1 to ensure that a voltage on the pull-up resistor R1 is in a range of logically low levels when the pull-up resistor R1 and the pull-down resistor R4 or R5 are switched on concurrently, that is, the voltage on the pull-up resistor R1 is almost 0 when R1 and R4 are switched on concurrently, where the pull-up resistor R1 can be several kilohms, and the resistances of the pull-down resistors R4 and R5 are at least 10 times the pull-up resistor R1 and can be several tens of kilohms, typically R1 is approximately 1.5KΩ, and R4 and R5 are approximately 15KΩ.

The resistances of pull-up resistors R2 and R3 are on the same order of magnitude and far above the resistances of R4 and R5 to ensure that a voltage on the pull-down R4 or R5 is in a range of logically low levels when the pull-up resistor R2 and the pull-down resistor R4 on the D+ data line are switched on concurrently or when the pull-up resistor R3 and the pull-down resistor R5 on the D− data line are switched on concurrently, where the resistances of the pull-up resistors R2 and R3 are at least 10 times the resistance of R4 or R5 and can be several hundreds of kilohms, typically approximately 300KΩ.

Figure 2B:
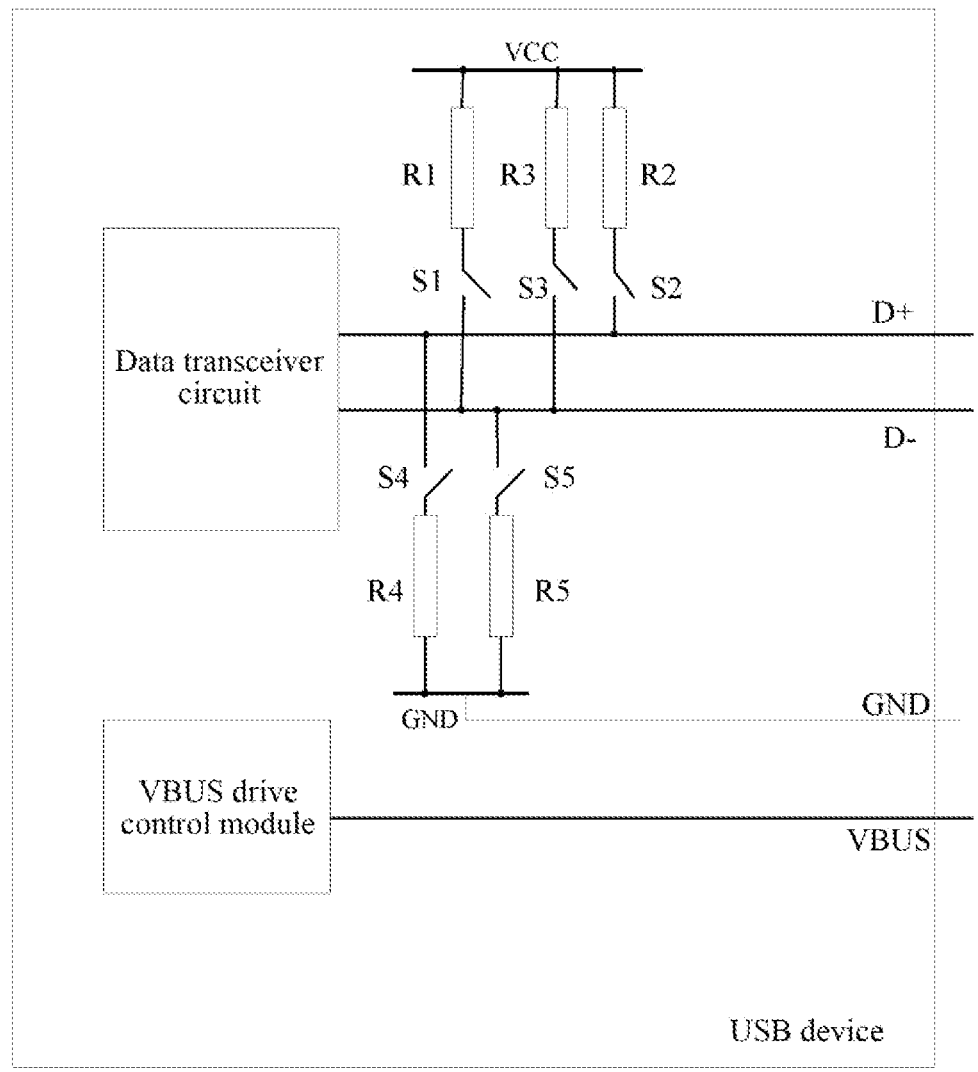
FIG. 2b is a structural diagram of a second USB device according to an embodiment of the invention.

FIG. 2b illustrates a second USB device according to an embodiment of the invention, which is a low-speed USB device and different from the USB device of FIG. 2a in that the series branch composed of the pull-up resistor R1 and the controllable switch S1 has one end connected to the power supply VCC and the other end connected to the D− data line.

Figure 3:
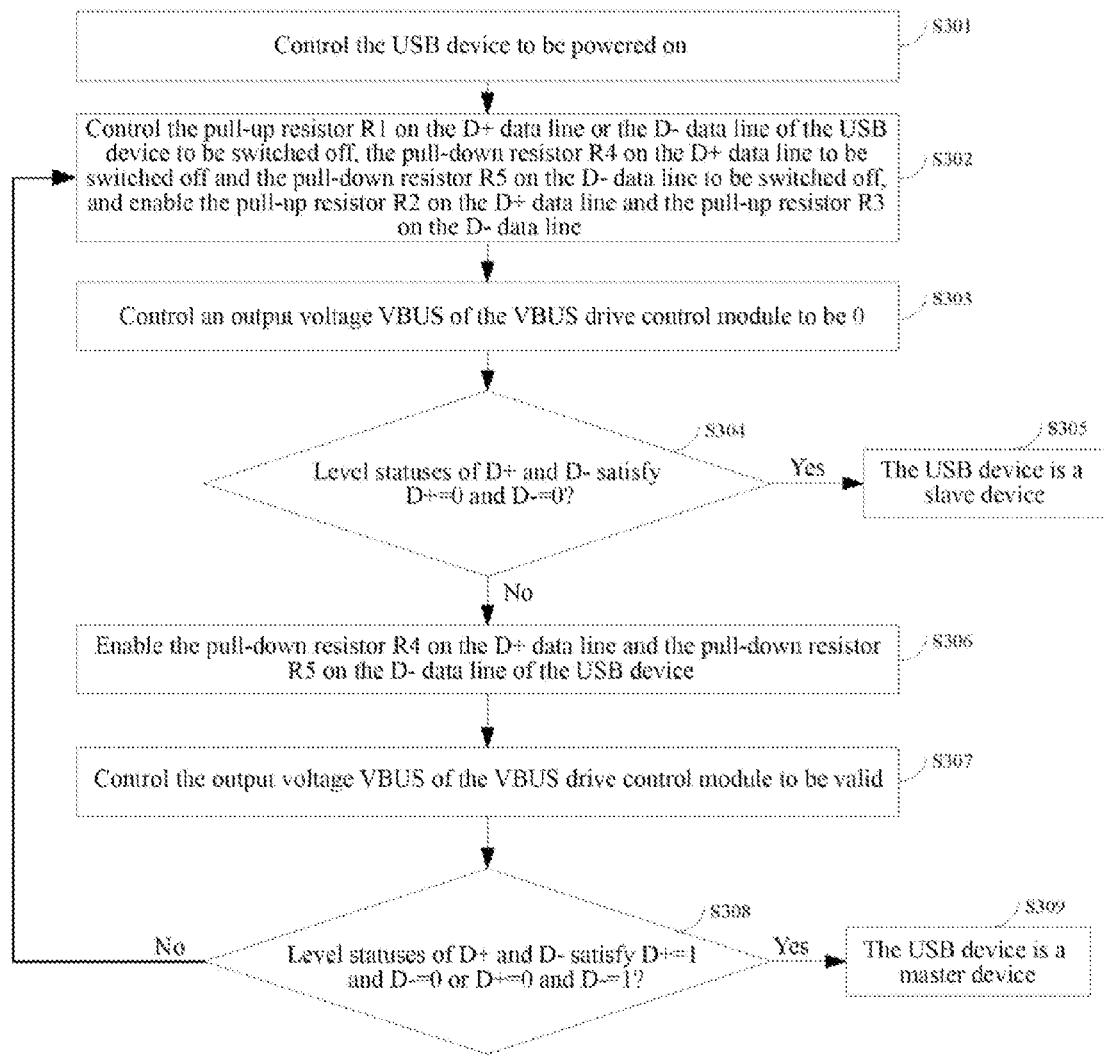
FIG. 3 is a flow chart of a first method for detecting a USB device according to an embodiment of the invention.

FIG. 3 illustrates a flow chart of a first method for detecting the USB device according to an embodiment of the invention, which includes the following steps.

S301 is to control the USB device to be powered on.

S302 is to control the pull-up resistor R1 on the D+ data line or the D− data line of the USB device to be switched off, the pull-down resistor R4 on the D+ data line to be switched off and the pull-down resistor R5 on the D− data line to be switched off, and to enable the pull-up resistor R2 on the D+ data line and the pull-up resistor R3 on the D− data line.

To enable a pull-up resistor or a pull-down resistor refers to connecting the pull-up resistor or the pull-down resistor into a circuit, that is, connecting the switch corresponding to the pull-up resistor or the pull-down resistor in FIG. 2.

To switch off a pull-up resistor or a pull-down resistor refers to disconnecting a switch corresponding to the pull-up resistor or the pull-down resistor.

If the D+ data line is connected with the pull-up resistor R1 and when the pull-up resistor R1 and the pull-down resistor R4 are switched on concurrently, or if the D− data line is connected with the pull-up resistor R1 and when the pull-up resistor R1 and the pull-down resistor R5 are switched on concurrently, a voltage on the pull-up resistor R1 is in a range of logically low levels, and when the pull-up resistor R2 and the pull-down resistor R4 on the D+ data line are switched on concurrently, or when the pull-up resistor R3 and the pull-down resistor R5 on the D− data line are switched on concurrently, a voltage on the pull-down resistor R4 or the pull-down resistor R5 is in a range of logically low levels.

Preferably, the resistances of the pull-down resistors R4 and R5 are at least 10 times the pull-up resistor R1, and the resistances of the pull-up resistors R2 and R3 are at least 10 times the pull-down resistors R4 and R5.

S303 is to control an output voltage VBUS of the VBUS drive control module to be 0.

Particularly, firstly the step S302 and then the step S303 can be performed or firstly the step S303 and then the step S302 can be performed without departing from the scope of the invention.

S304 is to detect level statuses of the data lines D+ and D− and to determine whether the level statuses of D+ and D− satisfy D+=0 and D−=0, and if so, the flow goes to the step S305; otherwise, the flow goes to the step S306.

S305 is to determine the USB device as a slave device and to start an operation flow of a USB slave device, which particularly is a flow in the prior art, and thus a repeated description thereof will be omitted here.

A determination criterion is that if the USB device is connected with a master device (e.g., a PC), on D+ and D− data lines of the master device there are pull-down resistors pulled down to GND and with the same resistances as R4 and R5, assumed R1=1.5K, R2, R3=300K, and R4, R5=15K, so the voltages of D+ and D− are approximately 0V, that is, 3.3V*15K/(300K+15K)≈0V.

Figure 5:
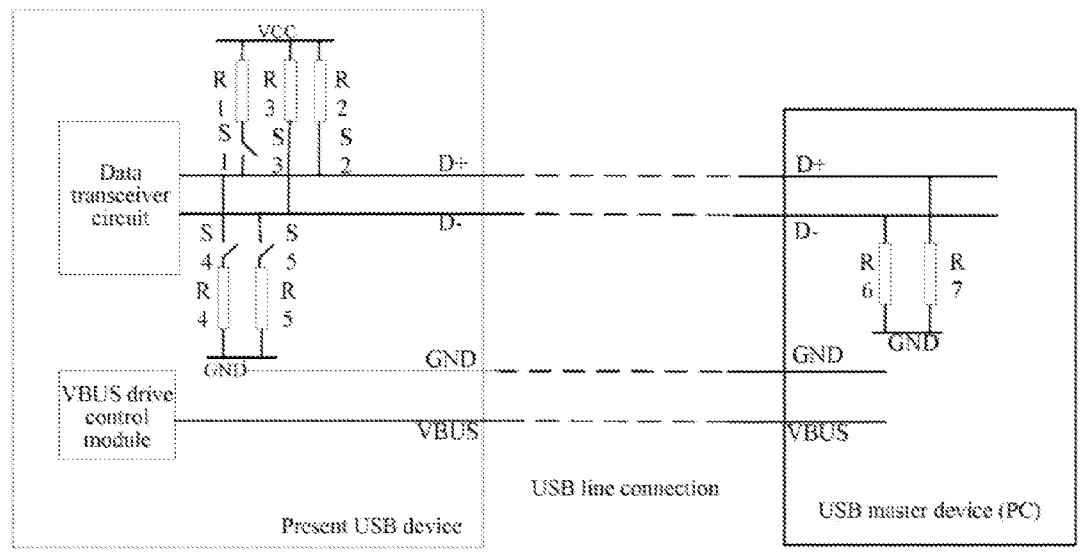
FIG. 5 is a schematic diagram of connecting the present USB device with a master device.

As illustrated in FIG. 5, which is a schematic diagram of connecting the present USB device with a master device, the D+ and D− data lines of the present USB device are connected respectively with the D+ and D− data lines of the master device, and there are pull-down resistors R6 and R7 (the resistance of R6 is the same as the resistance of R5, and the resistance of R7 is the same as the resistance of R4), pulled down to GND, respectively on the D+ and D− data lines of the master device, so the voltages of D+ and D− are approximately 0V, that is, 3.3V*15K/(300K+15K)≈0V.

Thus D+=0 and D−=0 indicates that the USB device is connected with a master device, that is, the USB device is a slave device.

S306 is to enable the pull-down resistor R4 on the D+ data line and the pull-down resistor R5 on the D− data line of the USB device.

S307 is to control the output voltage VBUS of the VBUS drive control module to be valid, that is, 4.75V<VBUS<5.25V, and of course, other ranges of values are also possible.

Particularly, firstly the step S306 and then the step S307 can be performed or firstly the step S307 and then the step S306 can be performed without departing from the scope of the invention.

S308 is to detect the level statuses of the data lines D+ and D− and to determine whether the level statuses of D+ and D− satisfy D+=1 and D−=0 or D+=0 and D−=1, and if so, the flow goes to the step S309; otherwise, the flow returns to the step S302 for further detection.

If not so, it indicates that there is currently no USB device connected with the present USB device, and the flow will return to the step S302 for further detection.

S309 is to determine the USB device as a master device and to start an operation flow of a USB master device, which particularly is a flow in the prior art, and thus a repeated description thereof will be omitted here.

A determination criterion here is that a USB slave device shall enable the pull-up resistor R1 on the D+ or D− data line within a specific period of time after valid VBUS is detected, as stipulated in the USB specification.

Figure 6:
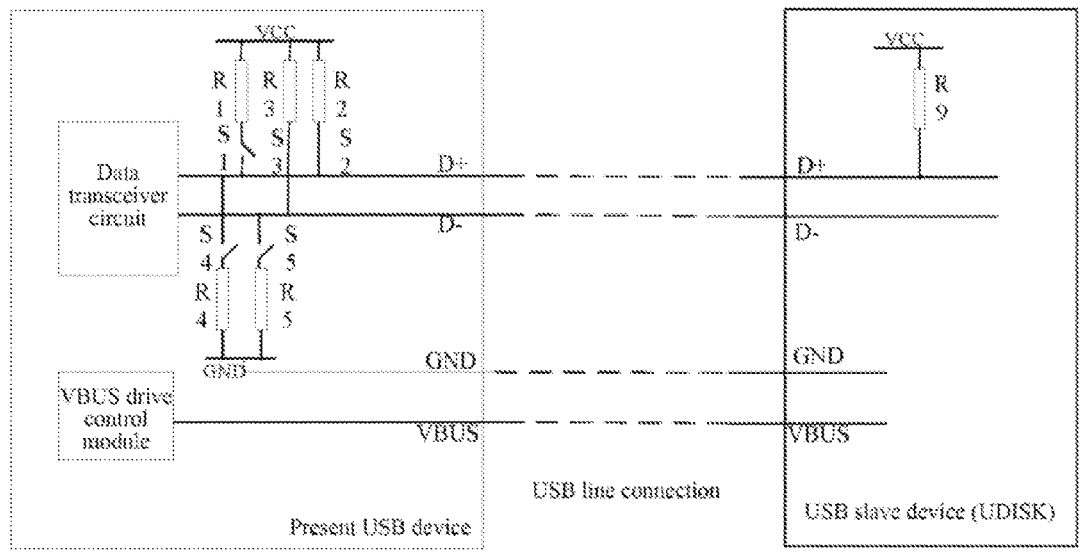
FIG. 6 is a schematic diagram of connecting the present USB device with a USB high-speed or full-speed slave device.

As illustrated in FIG. 6, which is a schematic diagram of connecting the present USB device with a USB high-speed or full-speed slave device, D+, D−, GND and VBUS of the present USB device are connected respectively with D+, D−, GND and VBUS of the slave device, and since the output voltage VBUS of the present USB device is valid, a pull-up resistor R9 of the slave device is connected to the D+ data line, and the slave device enables R9 (the resistance of R9 is the same as the resistance of the pull-up resistor R1), and then the voltage of D+ is approximately 3V, that is, 3.3V*15K/(1.5K+15K)≈3V, i.e., a logically high level of 1, and D− is still in a status of approximately 0V, that is, D+=1 and D−=0.

Figure 7:
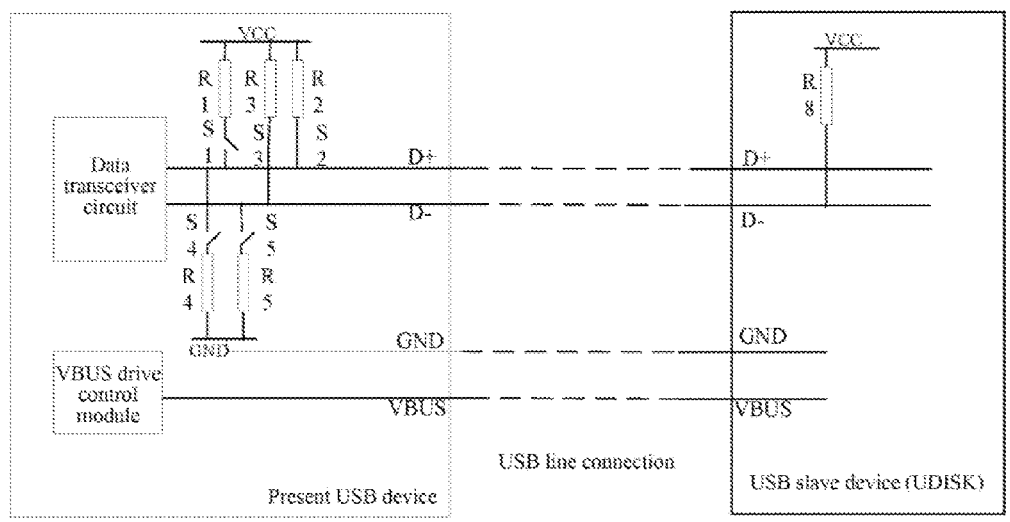
FIG. 7 is a schematic diagram of connecting the present USB device with a USB low-speed slave device.

As illustrated in FIG. 7, which is a schematic diagram of connecting the present USB device with a USB low-speed slave device, D+, D−, GND and VBUS of the present USB device are connected respectively with D+, D−, GND and VBUS of the slave device; and a pull-up resistor R8 of the slave device is connected to the D− data line, and the slave device enables R8 (the resistance of R8 is the same as the resistance of the pull-up resistor R1), and then the voltage of D− is approximately 3V, that is, 3.3V*15K/(1.5K+15K)≈3V, i.e., a logically high level of 1, and D+ is still in a status of approximately 0V, that is, D+=0 and D−=1.

Thus D+=1 and D−=0 or D+=0 and D−=1 indicates that the USB device is connected with a slave device, that is, the USB device is a master device.

Preferably, in the steps S304 and S308, a delay time can be set before the level statuses of the data lines D+ and D− are detected, and the level statuses of the data lines D+ and D− are detected after the level statuses of the D+ and D− data lines settle down after the set delay time.

In the foregoing method, firstly whether the USB device is a slave device is determined, and if not, whether the USB device is a master device is determined, and of course, it is also possible to determine firstly whether the USB device is a master device and then whether the USB device is a slave device.

Figure 4:
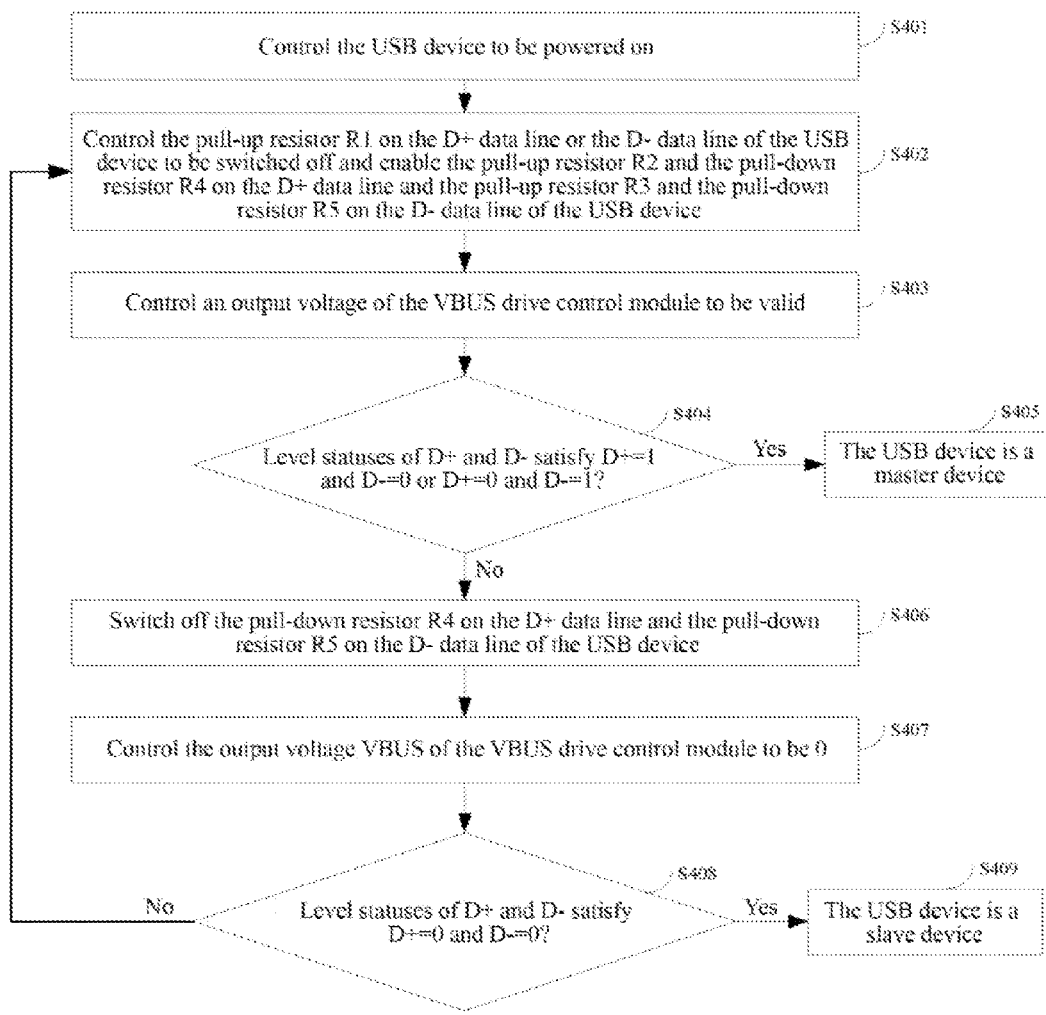
FIG. 4 is a flow chart of a second method for detecting a USB device according to an embodiment of the invention.

FIG. 4 illustrates a flow chart of a second method for detecting the USB device according to an embodiment of the invention, which includes the following steps.

S401 is to control the USB device to be powered on.

S402 is to control the pull-up resistor R1 on the D+ data line or the D− data line of the USB device to be switched off and to enable the pull-up resistor R2 and the pull-down resistor R4 on the D+ data line and the pull-up resistor R3 and the pull-down resistor R5 on the D− data line of the USB device.

If the D+ data line is connected with the pull-up resistor R1 and when the pull-up resistor R1 and the pull-down resistor R4 are switched on concurrently, or if the D− data line is connected with the pull-up resistor R1 and when the pull-up resistor R1 and the pull-down resistor R5 are switched on concurrently, a voltage on the pull-up resistor R1 is in a range of logically low levels, and when the pull-up resistor R2 and the pull-down resistor R4 on the D+ data line are switched on concurrently, or when the pull-up resistor R3 and the pull-down resistor R5 on the D− data line are switched on concurrently, a voltage on the pull-down resistor R4 or the pull-down resistor R5 is in a range of logically low levels.

Preferably, the resistances of the pull-down resistors R4 and R5 are at least 10 times the pull-up resistor R1, and the resistances of the pull-up resistors R2 and R3 are at least 10 times the pull-down resistors R4 and R5.

S403 is to control an output voltage of the USB drive control module to be valid, that is, 4.75V<VBUS<5.25V, and of course, other ranges of values are also possible.

Particularly, firstly the step S402 and then the step S403 can be performed or firstly the step S403 and then the step S402 can be performed without departing from the scope of the invention.

S404 is to detect level statuses of the D+ data line and the D− data line of the USB device and to determine whether the level statuses of D+ and D− satisfy D+=1 and D−=0 or D+=0 and D−=1, and if so, the flow goes to the step S405; otherwise, the flow goes to the step S406.

S405 is to determine the USB device as a master device and to start an operation flow of a USB master device.

S406 is to switch off the pull-down resistor R4 on the D+ data line and the pull-down resistor R5 on the D− data line of the USB device.

S407 is to control the output voltage VBUS of the VBUS drive control module to be 0.

Particularly, firstly the step S406 and then the step S407 can be performed or firstly the step S407 and then the step S406 can be performed without departing from the scope of the invention.

S408 is to detect the level statuses of the D+ and D− data lines of the USB device and to determine whether the level statuses of D+ and D− satisfy D+=0 and D−=0, and if so, the flow goes to the step S409; otherwise, the flow returns to the step S402 for further detection.

If not so, it indicates that there is currently no USB device connected with the present USB device, and the flow will return to the step S402 for further detection.

S409 is to determine the USB device as a slave device and to start an operation flow of a USB slave device.

Preferably, in the steps S404 and S408, a delay time can be set before the level statuses of the data lines D+ and D− are detected, and the level statuses of the data lines D+ and D− are detected after the level statuses of the D+ and D− data lines settle down after the set delay time When the present USB device and the opposite USB device are connected and adopt the same detection method, if both of the USB devices start detection concurrently (that is, perform the step S302 or the step S402 concurrently), both of the USB devices may determine themselves as a master device concurrently, thus the connection is invalid, and therefore have to restart detection, thus lowering the efficiency of the connection. Referring to FIG. 3, if the present USB device and the opposite USB device connected therewith are structurally identical and perform the step S302 in the detection method concurrently, each of the USB devices determines itself not as a slave device and outputs the valid voltage VBUS to the other while enabling the resistors R4 and R5, and both of the USB devices shall enable the pull-on resistor R1 on the D+ or D− data line within a specific period of time after the valid VBUS is detected, and thus in the step S309, both of them determine themselves as a master device, thus the connection is invalid. Referring to FIG. 4, if the present USB device and the opposite USB device connected therewith are structurally identical and perform the step S402 and the step S403 in the same method concurrently, each of the USB devices outputs the valid voltage VBUS to the other, and both of the USB devices shall enable the pull-on resistor R1 on the D+ or D− data line within a specific period of time after the valid VBUS is detected, and thus in the step S405, both of them determine themselves as a master device, thus the connection is invalid.

Preferably, in an embodiment of the invention, when both of the USB devices adopt the same detection method, the present USB device is configured with such a trigger condition that the present USB device does not start detection concurrently with the opposite USB device and to perform the step S302 when the trigger condition is satisfied so that the present USB device will not start detection concurrently with the opposite USB device. Specifically, for example, detection is configured to start upon reception of an external control signal, and thus the control signal can be input to control the two devices so that they will not perform detection concurrently, or detection is configured to start upon arrival of a preset timing, and the two devices are configured with different preset timings, thereby also ensuring that the two devices will not perform detection concurrently.

With the USB device and the detection method according to the embodiments of the invention, whether the USB device acts as a master device or a slave device can be identified automatically only using VBUS and the D+ and D− data lines without detecting a level status of the ID pin. Thus a resource of one pin can be saved in a chip of the USB DRD without influencing the performance of the USB device.

Evidently those skilled in the art can make various modifications and variations to the invention without departing from the scope of the invention. Thus the invention is also intended to encompass these modifications and variations thereto as long as these modifications and variations come into the scope of the claims appended to the invention and their equivalents.

The invention claimed is:

1. A USB device, comprising a data transceiver circuit and a VBUS drive control module, the data transceiver circuit having outputs connected respectively with a D+ data line and a D− data line, wherein the USB device further comprises:
   a first pull-up resistor, a second pull-up resistor, a third pull-up resistor, a first switch, a second switch, and a third switch, wherein a series branch, composed of the first pull-up resistor and the first switch, having one end connected with a power supply VCC and the other end connected with the D+ data line or the D− data line, a series branch, composed of the second pull-up resistor and the second switch, having one end connected with the VCC and the other end connected with the D+ data line, and a series branch, composed of the third pull-up resistor and the third switch, having one end connected with the VCC and the other end connected with the D− data line; and
   a fourth pull-down resistor, a fifth pull-down resistor, a fourth switch and a fifth switch, wherein a series branch, composed of the fourth pull-down resistor and the fourth switch, having one end grounded and the other end connected with the D+ data line, and a series branch, composed of the fifth pull-down resistor and the fifth switch, having one end grounded and the other end connected with the D− data line.

2. The device according to claim 1, wherein when the first pull-up resistor and the fourth pull-down resistor on the D+ data line are switched on concurrently, or when the first pull-up resistor and the fifth pull-down resistor on the D− data line are switched on concurrently, a voltage on the first pull-up resistor is in a range of logically low levels, and when the second pull-up resistor and the fourth pull-down resistor on the D+ data line are switched on concurrently, or when the third pull-up resistor and the fifth pull-down resistor on the D− data line are switched on concurrently, a voltage on the fourth pull-down resistor or the fifth pull-down resistor is in a range of logically low levels.

3. The device according to claim 1, wherein the resistances of the fourth and fifth pull-down resistors are at least 10 times the first pull-up resistor, the resistance of the second pull-up resistor is at least 10 times the fourth pull-down resistor, and the resistance of the third pull-up resistor is at least 10 times the fifth pull-down resistor.

4. A method for detecting the USB device according to claim 1, comprising:
   controlling the first pull-up resistor on the D+ data line or the D− data line of the present USB device to be switched off, the fourth pull-down resistor on the D+ data line to be switched off and the fifth pull-down resistor on the D− data line to be switched off, and enabling the second pull-up resistor on the D+ data line and the third pull-up resistor on the D− data line, wherein when the first pull-up resistor and the fourth pull-down resistor on the D+ data line are switched on concurrently, or when the first pull-up resistor and the fifth pull-down resistor on the D− data line are switched on concurrently, a voltage on the first pull-up resistor is in a range of logically low levels, and when the second pull-up resistor and the fourth pull-down resistor on the D+ data line are switched on concurrently, or when the third pull-up resistor and the fifth pull-down resistor on the D− data line are switched on concurrently, a voltage on the fourth pull-down resistor or the fifth pull-down resistor is in a range of logically low levels;

controlling an output voltage of the VBUS drive control module to be 0; and detecting level statuses of the D+ data line and the D− data line of the present USB device, and determining the present USB device as a slave device upon determining D+=0 and D−=0.

5. The method according to claim 4, wherein when the level statuses of the D+ data line and the D− data line do not satisfy D+=0 and D−=0, the method further comprises:

enabling the fourth pull-down resistor on the D+ data line and the fifth pull-down resistor on the D− data line of the present USB device;

controlling the output voltage of the VBUS drive control module to be valid; and detecting the level statuses of the D+ data line and the D− data line of the present USB device, and determining the present USB device as a master device upon determining D+=0 and D−=1, or D+=1 and D−=0.

6. The method according to claim 4, wherein before detecting the level statuses of the D+ data line and the D− data line of the present USB device, the method further comprises:

delaying for a set period of time until the level statuses of the D+ data line and the D− data line of the present USB device settle down.

7. The method according to claim 4, wherein the resistances of the fourth and fifth pull-down resistors are at least 10 times the first pull-up resistor, the resistance of the second pull-up resistor is at least 10 times the fourth pull-down resistor, and the resistance of the third pull-up resistor is at least 10 times the fifth pull-down resistor.

8. The method according to claim 4, wherein:

an opposite USB device connected with the present USB device adopts the same detection method as the present USB device, the present USB device is configured with such a trigger condition that the present USB device does not start detection concurrently with the opposite USB device, and the present USB device starts detection when the trigger condition is satisfied.

9. A method for detecting the USB device according to claim 1, comprising:

controlling the first pull-up resistor on the D+ data line or the D− data line of the present USB device to be switched off, and enabling the second pull-up resistor and the fourth pull-down resistor on the D+ data line and the third pull-up resistor and the fifth pull-down resistor on the D− data line, wherein when the first pull-up resistor and the fourth pull-down resistor on the D+ data line are switched on concurrently, or when the first pull-up resistor and the fifth pull-down resistor on the D− data line are switched on concurrently, a voltage on the first pull-up resistor is in a range of logically low levels, and when the second pull-up resistor and the fourth pull-down resistor on the D+ data line are switched on concurrently, or when the third pull-up resistor and the fifth pull-down resistor on the D− data line are switched on concurrently, a voltage on the fourth pull-down resistor or the fifth pull-down resistor is in a range of logically low levels;

controlling an output voltage of the VBUS drive control module to be valid; and detecting level statuses of the D+ data line and the D− data line of the present USB device, and determining the present USB device as a master device upon determining D+=0 and D−=1, or D+=1 and D−=0.

10. The method according to claim 9, wherein when the level statuses of the D+ data line and the D− data line do not satisfy D+=0 and D−=1, or D+=1 and D−=0, the method further comprises:

switching off the fourth pull-down resistor on the D+ data line and the fifth pull-down resistor on the D− data line of the present USB device;

controlling the output voltage VBUS of the VBUS drive control module to be 0; and detecting the level statuses of the D+ data line and the D− data line of the present USB device, and determining the present USB device as a slave device upon determining D+=0 and D−=0.

11. The method according to claim 9, wherein before detecting the level statuses of the D+ data line and the D− data line of the present USB device, the method further comprises:

delaying for a set period of time until the level statuses of the D+ data line and the D− data line of the present USB device settle down.

12. The method according to claim 9, wherein the resistances of the fourth and fifth pull-down resistors are at least 10 times the first pull-up resistor, the resistance of the second pull-up resistor is at least 10 times the fourth pull-down resistor, and the resistance of the third pull-up resistor is at least 10 times the fifth pull-down resistor.

13. The method according to claim 9, wherein:

an opposite USB device connected with the present USB device adopts the same detection method as the present USB device, the present USB device is configured with such a trigger condition that the present USB device does not start detection concurrently with the opposite USB device, and the present USB device starts detection when the trigger condition is satisfied.

14. The method according to claim 5, wherein before detecting the level statuses of the D+ data line and the D− data line of the present USB device, the method further comprises:

delaying for a set period of time until the level statuses of the D+ data line and the D− data line of the present USB device settle down.

15. The method according to claim 10, wherein before detecting the level statuses of the D+ data line and the D− data line of the present USB device, the method further comprises:

delaying for a set period of time until the level statuses of the D+ data line and the D− data line of the present USB device settle down.

* * * * *